United States Patent [19]
Hoos

[11] Patent Number: 5,220,690
[45] Date of Patent: Jun. 22, 1993

[54] THUMB GUARD NOVELTY DEVICE

[76] Inventor: Barbara J. Hoos, 4411 Lapeer Rd., Burton, Mich. 48509

[21] Appl. No.: 900,655

[22] Filed: Jun. 19, 1992

[51] Int. Cl.$^5$ .............................................. A41D 19/00
[52] U.S. Cl. .............................................. 2/21; 2/160
[58] Field of Search .................. 2/20, 21, 161 A, 163, 2/161 R, 160, 159; 294/25; 224/217, 218, 219; 206/460; 40/639

[56] References Cited

U.S. PATENT DOCUMENTS

| | | | |
|---|---|---|---|
| 1,165,970 | 12/1915 | Harris | 2/159 X |
| 1,520,693 | 12/1924 | Brown | 2/159 X |
| 1,916,921 | 7/1933 | Dougan | 2/21 |
| 2,403,530 | 7/1946 | Holtzman | 206/460 |
| 3,728,736 | 4/1973 | Pugh | 2/21 |
| 3,811,684 | 5/1974 | Tredway, Sr. | 2/161 A X |
| 4,507,804 | 4/1985 | Consigny | 2/21 |

Primary Examiner—Clifford D. Crowder
Assistant Examiner—Sara M. Current
Attorney, Agent, or Firm—Leon Gilden

[57] ABSTRACT

A flexible sheath is arranged to receive a thumb therewithin, wherein the sheath is directed to a sheath strap, and the sheath strap is secured to a mounting band, with the mounting band arranged for mounting to an individual's thumb adjacent a first end of the thumb, with the sheath arranged for receiving a second end of the thumb for securing the sheath structure relative to an individual's thumb.

2 Claims, 4 Drawing Sheets

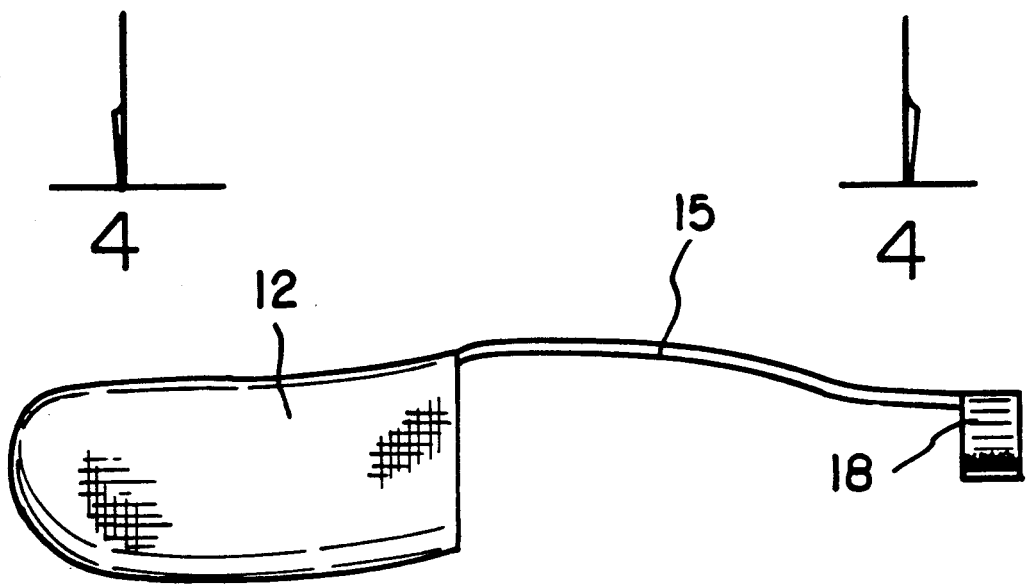
FIG 3
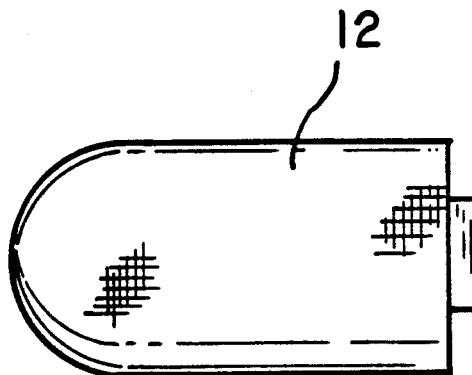
FIG 4
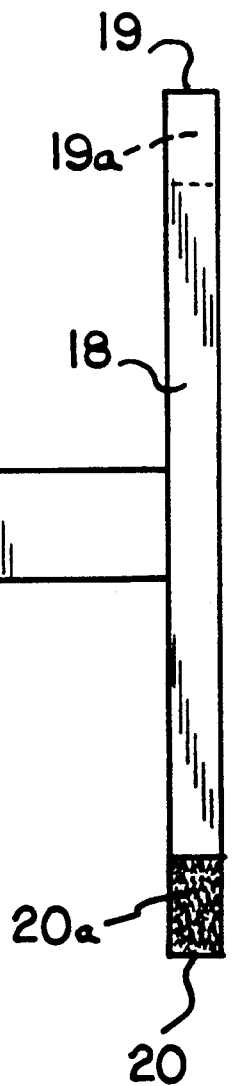

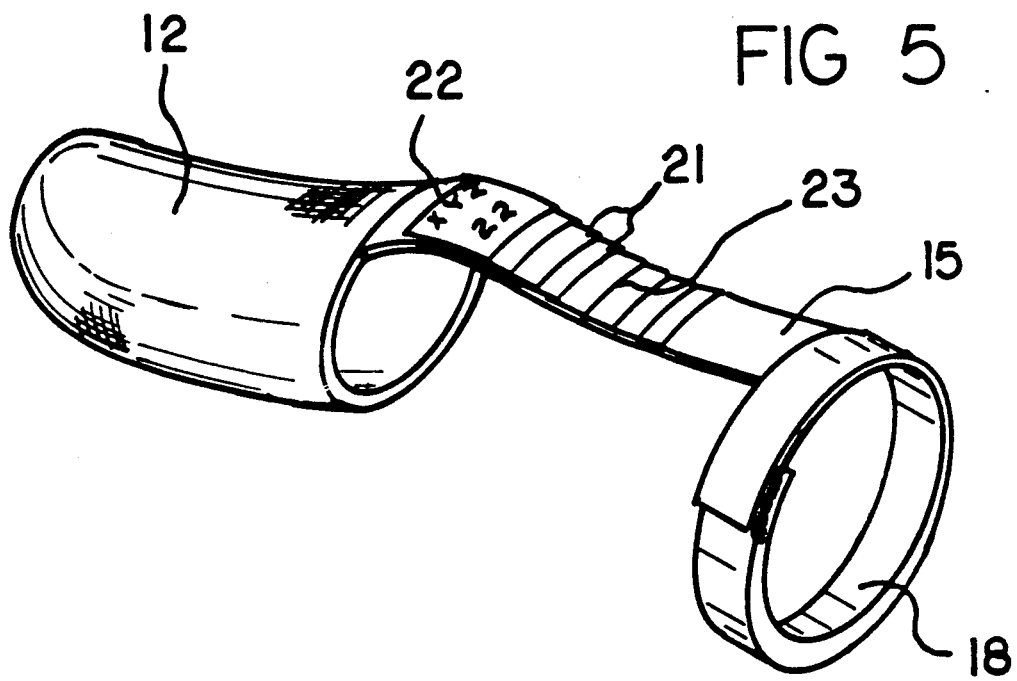
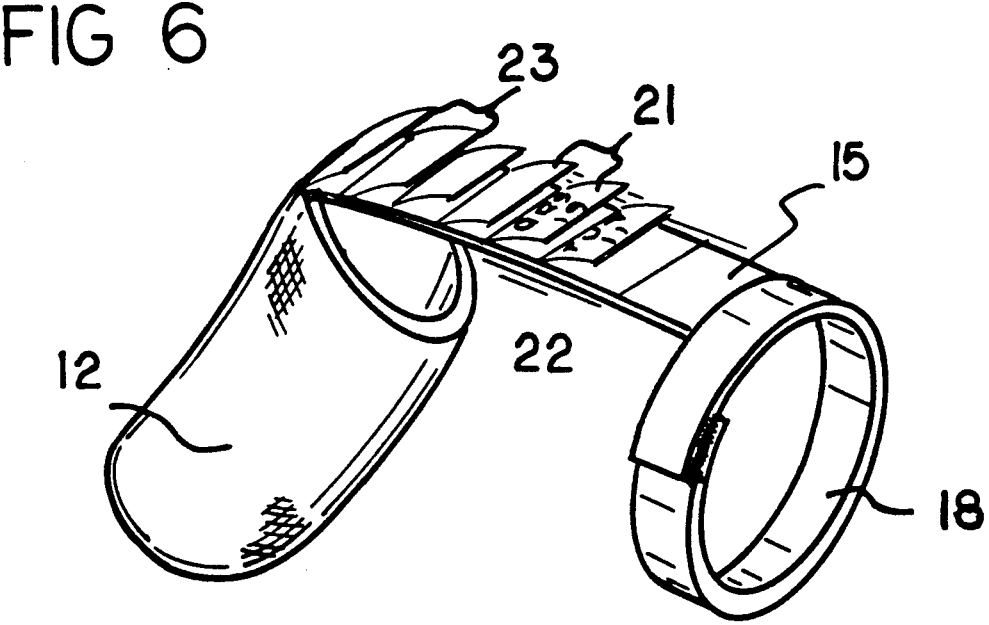

THUMB GUARD NOVELTY DEVICE

BACKGROUND OF THE INVENTION

1. Field of the Invention

The field of invention relates to novelty apparatus, and more particularly pertains to a new and improved thumb guard novelty device wherein the same is arranged to provide and afford protection to a thumb member indicative of over-use of remote control devices by individuals in a novelty scenario.

2. Description of the Prior Art

In the use of remote control devices for T.V.s and the like, typically an individual dominates utilization of the remote control device. The instant invention attempts to psychologically address such use by directing such dominant individuals to adorn the thumb guard structure of the invention as indication of their abuse in use of such remote control devices. Prior art thumb guard structure is exemplified in the prior art and set forth in U.S. Pat. Nos. 4,658,441; 4,796,302; 3,728,736; and 4,908,881.

Accordingly, it may be appreciated that there continues to be a need for a new and improved thumb guard novelty device as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of thumb guard apparatus now present in the prior art, the present invention provides a thumb guard novelty device wherein the same is arranged for mounting in surrounding relationship relative to an individual's thumb to afford protection and indicate abuse and control of a remote control organization. As such, the general purpose of the present invention, which will be described subsequently in greater detail, is to provide a new and improved thumb guard novelty device which has all the advantages of the prior art thumb guard apparatus and none of the disadvantages.

To attain this, the present invention provides a flexible sheath arranged to receive a thumb therewithin, wherein the sheath is directed to a sheath strap, and the sheath strap is secured to a mounting band, with the mounting band arranged for mounting to an individual's thumb adjacent a first end of the thumb, with the sheath arranged for receiving a second end of the thumb for securing the sheath structure relative to an individual's thumb.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved thumb guard novelty device which has all the advantages of the prior art thumb guard apparatus and none of the disadvantages.

It is another object of the present invention to provide a new and improved thumb guard novelty device which may be easily and efficiently manufactured and marketed.

It is a further object of the present invention to provide a new and improved thumb guard novelty device which is of a durable and reliable construction.

An even further object of the present invention is to provide a new and improved thumb guard novelty device which is susceptible of a low cost of manufacture with regard to both materials and labor, and which accordingly is then susceptible of low prices of sale to the consuming public, thereby making such thumb guard novelty devices economically available to the buying public.

Still yet another object of the present invention is to provide a new and improved thumb guard novelty device which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic side view of the invention.

FIG. 4 is an orthographic top view of the invention, taken along the lines 4—4 of FIG. 3 in the direction indicated by the arrows.

FIG. 5 is an isometric illustration of the invention utilizing a modified sheath strap.

FIG. 6 is an isometric illustration of the modified sheath strap effecting pivotment of the informative tab plates mounted thereon.

DESCRIPTION OF THE PREFERRED EMBODIMENT

Figure 1:
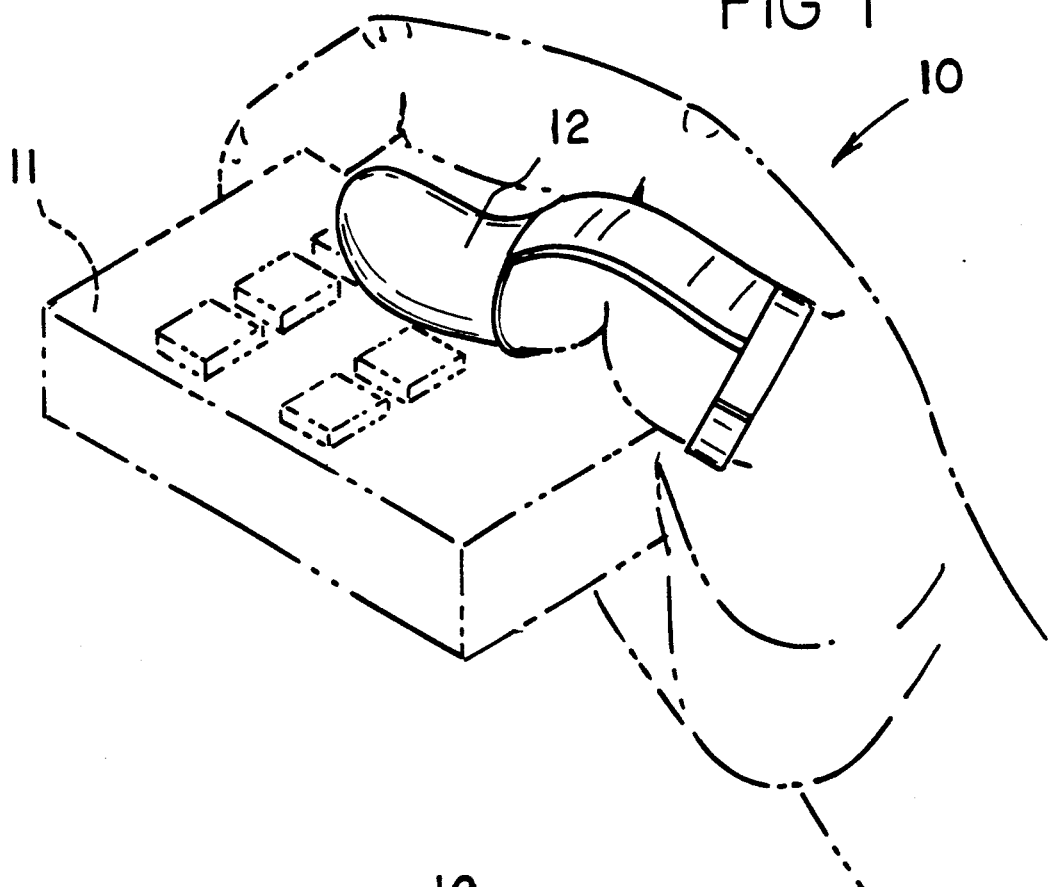
FIG. 1 is an isometric illustration of the instant invention in use.
Figure 2:
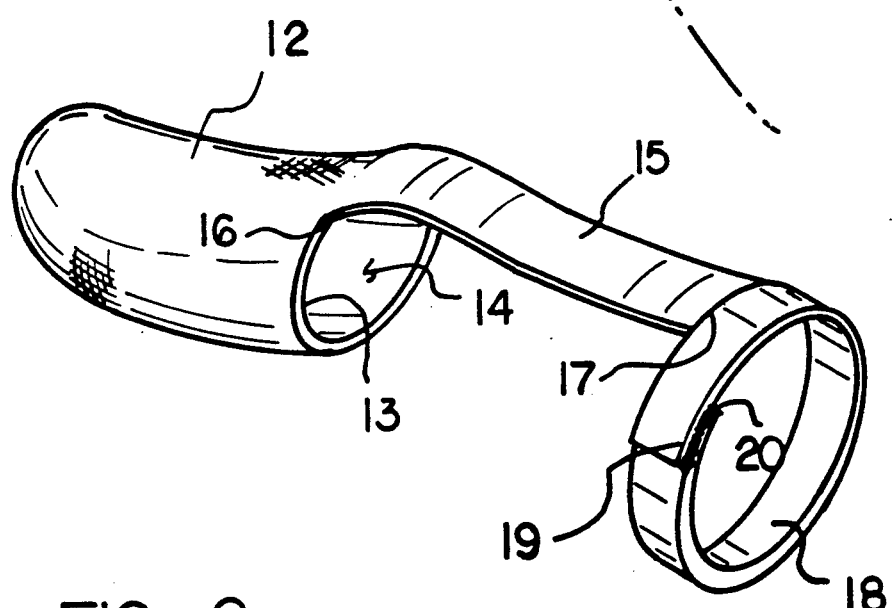
FIG. 2 is an isometric enlarged illustration of the invention.

With reference now to the drawings, and in particular to FIGS. 1 to 9 thereof, a new and improved thumb guard novelty device embodying the principles and concepts of the present invention and generally designated by the reference numeral 10 will be described.

More specifically, the thumb guard novelty device 10 of the instant invention essentially comprises the use of the organization relative to a remote control device 11, with a flexible thumb receiving sheath 12 having an entrance opening end 13 directing access to a sheath cavity 14, with a sheath forward end 12a arranged at a distal end relative to the entrance opening end 13. A sheath strap 15 is fixedly mounted at its first end 16 to the entrance opening ends 13 and extends therefrom, having its second ends fixedly secured to a mounting band 18. The mounting band 18 includes respective band first and second ends 19 and 20 having respective first hook and loop fastener surfaces 19a and 20a mounted adjacent the first and second ends of the band arranged for securement relative to one another for mounting to a first end of an individual's thumb spaced from the sheath structure.

A plurality of informative tab plates 21 are positioned in an overlapping arrangement relative to a top surface of the sheath strap 15, with each tab plate 21 having a tab plate upper end 22 fixedly mounted to the top surface of the sheath strap 15 and a free lower end 23 arranged for pivotment relative to the top surface of the sheath strap upon flexure of the sheath 12 relative to the sheath strap 15, in a manner as indicated in FIG. 6.

Figure 7:
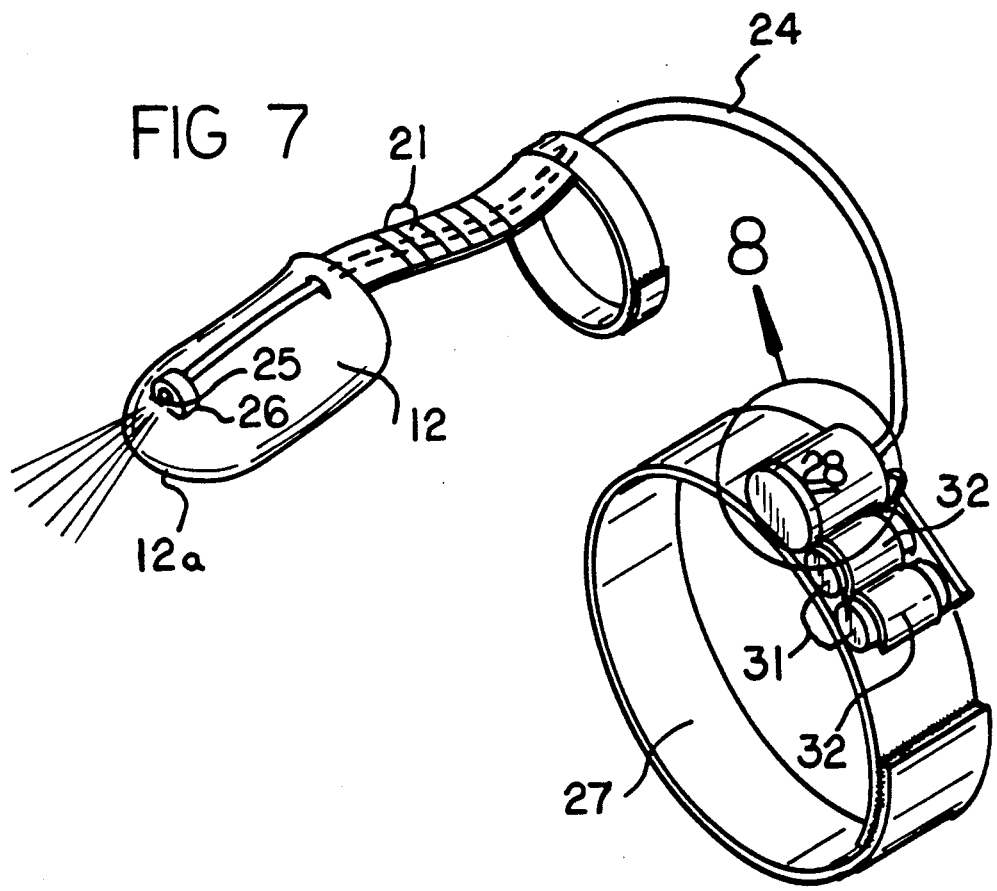
FIG. 7 is an isometric illustration of the invention utilizing an illumination structure.
Figure 9:
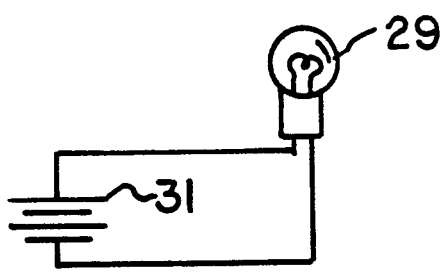
FIG. 9 is a diagrammatic illustration of the illumination bulb circuitry employed by the invention.
Figure 8:
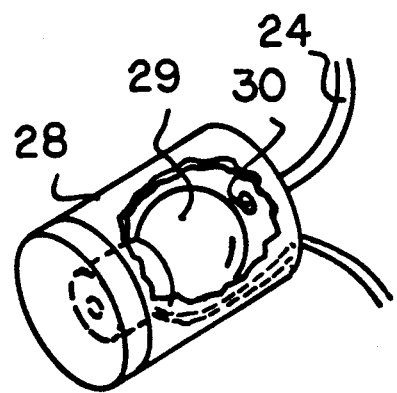
FIG. 8 is an enlarged isometric illustration of section 8 as set forth in FIG. 7.

The FIGS. 7-9 indicate the use of a fiber optic cable 24 having a cable first end 25 positioned in adjacency relative to the sheath forward end 12a mounted within a positioning block 26. The cable 24 extends along the sheath and through the sheath strap 15 to extend to a fiber optic cable second end 30 directed into an illumination housing 28 that in turn is secured to a wrist strap 27. The wrist strap 27 includes a plurality of battery members 31 mounted within resilient loops 32 for their replacement. The battery members are in electrical communication with the illumination bulb 29 mounted within the illumination housing 28 that is positioned in adjacency relative to the fiber optic cable second end 30 to direct illumination through the fiber optic cable and ultimately through the cable's first end 25 for illumination of the remote control device 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A thumb guard novelty device, comprising,
    a flexible thumb receiving sheath having an entrance opening end spaced from a forward end, with the entrance opening end directed into a sheath cavity, and
    a sheath strap having a sheath strap first end and a sheath strap second end, the sheath strap first end fixedly secured to the entrance opening end, and
    a mounting band, with the sheath strap second end fixedly secured to the mounting band spaced from the sheath, the mounting band having a mounting band first end and a mounting band second end, the mounting band first end including a first fastener, the mounting band second end including a second fastener, with the first fastener arranged for securement to the second fastener around an individual's thumb spaced from the sheath, and
    a plurality of informative tab plates, the tab plates arranged in an overlapping relationship relative to one another, with each tab plate including a tab plate end mounted to a top surface of the sheath, and a tab plate lower end spaced from the tab plate upper end permitting flexure and pivotment of the lower end relative to the upper end upon flexure of the sheath and the sheath strap, and
    including a fiber optic cable, the fiber optic cable including a fiber optic cable first end and a fiber optic cable second end, the fiber optic cable first end mounted within a positioning block, the positioning block fixedly mounted to an outer surface of the sheath adjacent the sheath forward end, the fiber optic cable directed through the sheath strap, and wherein the fiber optic cable second end is arranged in a spaced relationship relative to the sheath strap and the mounting band, and an illumination housing, with the fiber optic cable second end directed into the illumination housing, the illumination housing including an illumination bulb contained therewithin, the illumination housing including a wrist strap, with the illumination housing mounted to an exterior surface of the wrist strap, and at least one resilient loop positioned adjacent the illumination housing and a battery member positioned within the resilient loop, and an illumination bulb contained within the illumination housing positioned in adjacency relative to the fiber optic cable second end, and the battery member arranged in electrical communication with the illumination bulb to direct illumination through the fiber optic cable and to project illumination through the fiber optic cable first end.

2. A thumb guard novelty device, comprising, a flexible thumb receiving sheath having an entrance opening end spaced from a forward end, with the entrance opening end directed into a sheath cavity, and a sheath strap having a sheath strap first end and a sheath strap second end, the sheath strap first end fixedly secured to the entrance opening end, and a mounting band, with the sheath strap second end fixedly secured to the mounting band spaced from the sheath, the mounting band having a mounting band first end and a mounting band second end, the mounting band first end including a first fastener, the mounting band second end including a second fastener, with the first fastener arranged for securement to the second fastener around an individual's thumb spaced from the sheath, and a plurality of informative tab plates, the tab plates arranged in an overlapping relationship relative to one another, with each tab plate including a tab plate upper end mounted to a top surface of the sheath, and a tab plate lower end spaced from the tab plate upper end permitting flexure and pivotment of the lower end relative to the upper end upon flexure of the sheath and the sheath strap.

* * * * *